United States Patent
Glugla et al.

(10) Patent No.: US 9,115,658 B2
(45) Date of Patent: Aug. 25, 2015

(54) CONTROLLING CHARGE AIR COOLER CONDENSATION BY USING HEATED INTAKE AIR

(71) Applicant: Ford Global Technologies, LLC, Dearborn, MI (US)

(72) Inventors: Chris Paul Glugla, Macomb, MI (US); Ken Jahr, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 13/711,312

(22) Filed: Dec. 11, 2012

(65) Prior Publication Data

US 2014/0158089 A1    Jun. 12, 2014

(51) Int. Cl.
| | |
|---|---|
| *F02B 29/04* | (2006.01) |
| *F02D 41/00* | (2006.01) |
| *F02D 37/02* | (2006.01) |
| *F02M 35/10* | (2006.01) |
| *F02M 35/108* | (2006.01) |
| *F02M 25/07* | (2006.01) |

(52) U.S. Cl.
CPC ........ *F02D 41/0007* (2013.01); *F02B 29/0468* (2013.01); *F02D 37/02* (2013.01); *F02M 25/0707* (2013.01); *F02M 35/108* (2013.01); *F02M 35/10013* (2013.01); *F02M 35/10268* (2013.01); *F02D 2200/0418* (2013.01); *F02M 35/1038* (2013.01); *Y02T 10/144* (2013.01); *Y02T 10/146* (2013.01)

(58) Field of Classification Search
CPC ..................... F02D 2009/0206; F02D 42/0002; F02D 41/0007; F02D 37/02; F02B 29/0468; F02M 23/14; F02M 25/0707; F02M 35/10013; F02M 35/10268; F02M 35/108; F02M 35/1038
USPC .......... 123/403, 184.52, 563; 60/599
See application file for complete search history.

(56) References Cited

U.S. PATENT DOCUMENTS

| | | | | |
|---|---|---|---|---|
| 4,295,454 | A * | 10/1981 | Iida | 123/556 |
| 6,295,973 | B1 * | 10/2001 | Yang | 123/543 |
| 6,367,256 | B1 * | 4/2002 | McKee | 60/605.2 |
| 6,675,579 | B1 * | 1/2004 | Yang | 60/599 |
| 7,007,680 | B2 * | 3/2006 | Tussing et al. | 123/568.12 |
| 7,213,585 | B2 * | 5/2007 | Yang | 123/543 |
| 7,438,062 | B2 | 10/2008 | Okawa et al. | |
| 8,028,438 | B2 | 10/2011 | Pedtke | |
| 8,042,335 | B2 * | 10/2011 | Pursifull et al. | 60/602 |
| 8,061,135 | B2 | 11/2011 | Rutherford | |
| 2004/0244782 | A1 * | 12/2004 | Lewallen | 123/568.12 |
| 2006/0272621 | A1 | 12/2006 | Acuna et al. | |

* cited by examiner

FOREIGN PATENT DOCUMENTS

JP       5076822 B2 *  11/2012

OTHER PUBLICATIONS

Surnilla, Gopichandra et al., "Engine Control Coordination with Grille Shutter Adjustment and Ambient Conditions," U.S. Appl. No. 13/656,542, filed Oct. 19, 2012, 33 pages.
Glugla, Chris Paul et al., "Engine Control System and Method," U.S. Appl. No. 13/648,784, filed Oct. 10, 2012, 47 pages.
Glugla, Chris Paul et al., "Method for Controlling a Variable Charge Air Cooler," U.S. Appl. No. 13/589,942, filed Aug. 20, 2012, 41 pages.
Glugla, Chris Paul et al., "Condensation Control in a Charge Air Cooler by Controlling Charge Air Cooler Temperature," U.S. Appl. No. 13/664,248, Filed Oct. 30, 2012, 49 pages.
Cockerill, Charles A. et al., "Charge Air Cooler Control System and Method," U.S. Appl. No. 13/567,979, filed Aug. 6, 2012, 33 pages.

*Primary Examiner* — Lindsay Low
*Assistant Examiner* — Robert Werner
(74) *Attorney, Agent, or Firm* — Julia Voutyras; Alleman Hall McCoy Russell & Tuttle LLP

(57) ABSTRACT

Methods and systems are provided for adjusting the temperature of intake air entering an engine. In response to condensate in a charge air cooler and engine operating conditions, the position of an induction valve is adjusted to draw in air from a warm or cool air duct. Induction valve operation is further controlled to reduce fuel economy losses.

20 Claims, 5 Drawing Sheets

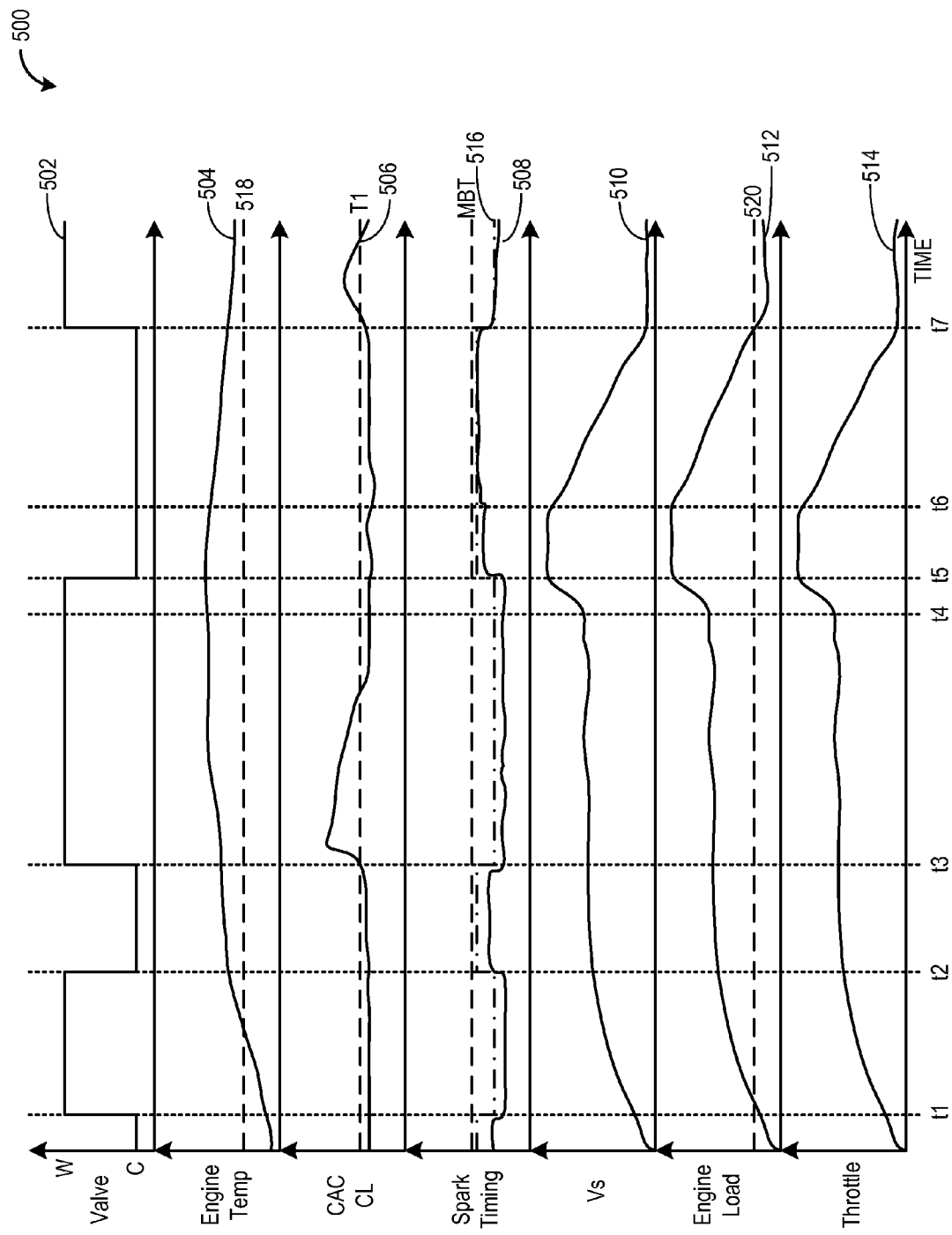

CONTROLLING CHARGE AIR COOLER CONDENSATION BY USING HEATED INTAKE AIR

BACKGROUND/SUMMARY

Turbocharged and supercharged engines may be configured to compress ambient air entering the engine in order to increase power. Compression of the air may cause an increase in air temperature, thus, a charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire and combustion instability.

One approach to address condensate formation in the CAC may involve using warm or heated intake air. Heated intake air may increase the temperature of the charge air entering the CAC. By increasing the charge air temperature at the CAC inlet, the air traveling through the CAC may be further away from the condensation point, reducing the amount of condensation and engine misfire. However, warmer intake air may increase the temperature of the air entering the engine intake manifold and result in increased knock during warmer engine operating conditions.

In one example, this apparent paradox may be addressed by a method for adjusting a fresh air source position of intake air responsive to a condition of a charge air cooler. For example, by adjusting the position of an induction valve, warmer air or cooler air may be drawn into the induction system. The adjusting may be responsive to operating conditions in order to concurrently address warm-up operation, condensate formation, and potential for engine knock. For example, when an amount of condensate in the CAC is above a threshold level and/or engine temperature is below a threshold temperature, the induction valve may be adjusted into a first position to draw in warm intake air. In another example, when spark timing is within a threshold of a borderline knock limit, the induction valve may be adjusted into a second position to draw in cooler intake air.

In this way, fuel economy losses and condensate formation in the CAC may be reduced. For example, in response to increased condensate formation, warmer intake air may be used to increase the temperature of the air entering the CAC. Thus, the air traveling through the CAC may be further away from the condensation point, reducing the amount of condensate that forms. Additionally, in response to a lower engine temperature, warmer intake air may be used to accelerate engine warm-up during a cold start (e.g., increase engine temperature) and reduce pumping losses. By reducing pumping losses, fuel economy may be increased. Warmer intake air may also increase the temperature of an intake throttle body, reducing throttle body icing. Alternatively, in response to an engine knock indication, cooler intake air may be used to adjust a borderline knock limit. The engine knock indication may include whether spark timing is within a threshold of a borderline limit. When spark retard nears the borderline knock limit, fuel economy losses may increase. Thus, cooler intake air may reduce these losses and increase fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a graphical example for adjusting an induction valve based on engine operating conditions

DETAILED DESCRIPTION

Figure 1:
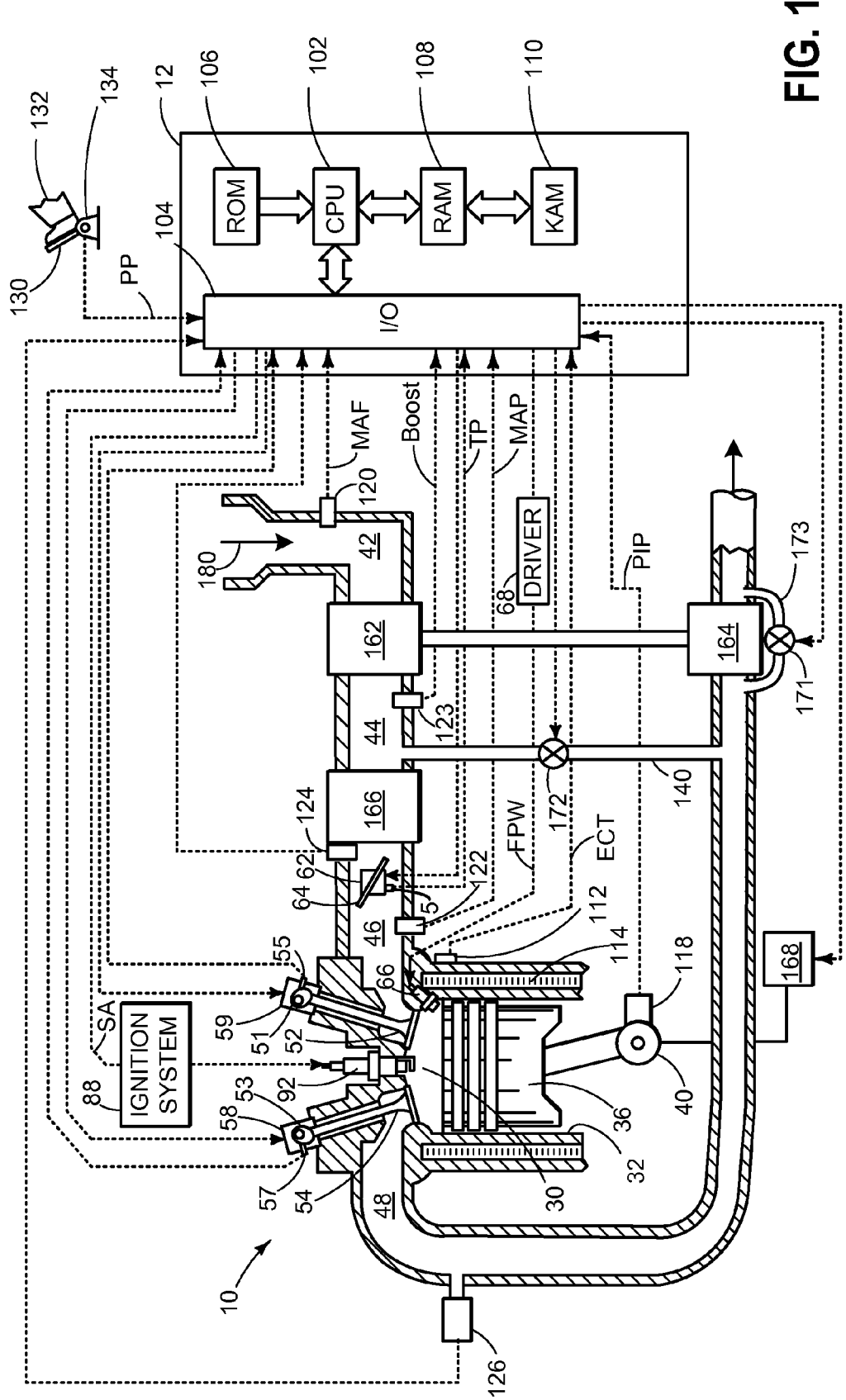
FIG. 1 is a schematic diagram of an example engine system including a charge air cooler.

The following description relates to systems and methods for addressing condensate in a charge air cooler (CAC), including adjusting the location from which intake air is drawn into an engine system, such as the system of FIG. 1. An induction valve may be adjusted to control the temperature of the intake air entering an induction system of the engine, such as the system shown in FIG. 2. A method for adjusting the position of the induction valve responsive to engine operating conditions is presented at FIG. 3. The engine operating conditions may include engine temperature and condensate formation in the CAC, which may be determined by a method presented at FIG. 4. Example induction valve adjustments based on engine operating conditions are shown at FIG. 5.

Referring now to FIG. 1, internal combustion engine 10, comprising a plurality of cylinders, one cylinder of which is shown in FIG. 1, is controlled by electronic engine controller 12. Engine 10 includes combustion chamber (cylinder) 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57. In this way, controller 12 may control the cam timing through phasers 58 and 59. Variable cam timing (VCT) may be either advanced or retarded, depending on various factors such as engine load and engine speed (RPM).

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Air intake 42 may be part of an induction system which draws in air from one or more ducts (not shown in FIG. 1). The one or more ducts may draw in cooler or warmer air from outside the vehicle or underneath the hood of the vehicle, respectively. An induction valve (not shown in FIG. 1) may then control the location from which intake air is drawn into the induction system. The intake air 180 may travel downstream from the induction valve to the air intake 42. Details on the induction system and induction valve are presented at FIG. 2.

Exhaust gases spin turbine 164 which is coupled to compressor 162 which compresses air in boost chamber 44. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Turbocharger waste gate 171 is a valve that allows exhaust gases to bypass turbine 164 via bypass passage 173 when turbocharger waste gate 171 is in an open state. Substantially all exhaust gas passes through turbine 164 when waste gate 171 is in a fully closed position.

Further, in the disclosed embodiments, an exhaust gas recirculation (EGR) system may route a desired portion of exhaust gas from exhaust manifold 48 to intake boost chamber 44 via EGR passage 140. The amount of EGR provided to intake boost chamber 44 may be varied by controller 12 via EGR valve 172. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below. Specifically, EGR contains a large amount of water as it is a combustion by-product. Since EGR is at a relatively high temperature and contains a lot of water, the dew-point temperature may also be relatively high. Consequently, condensate formation from EGR can even be much higher than condensate formation from compressing air and lowering it to the dew-point temperature.

Intake boost chamber 44 may further include charge air cooler (CAC) 166 (e.g., an intercooler) to decrease the temperature of the turbocharged or supercharged intake gases. In some embodiments, CAC 166 may be an air to air heat exchanger. In other embodiments, CAC 166 may be an air to liquid heat exchanger. CAC 166 may include a valve to selectively modulate the flow velocity of intake air traveling through the charge air cooler 166 in response to condensation formation within the charge air cooler.

Hot charge air from the compressor 162 enters the inlet of the CAC 166, cools as it travels through the CAC 166, and then exits to pass though the throttle 62 and into the engine intake manifold 46. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Condensate may collect at the bottom of the CAC, and then be introduced at once into the engine during an acceleration event. This may increase the chance of engine misfire or combustion instability (in the form of late/slow burns) due to the ingestion of water.

By controlling the temperature across the CAC, (e.g., inlet and outlet charge air temperatures) condensate formation may be reduced, reducing the chance of engine misfire. In one example, by increasing the charge air temperature at the CAC inlet, the air traveling through the CAC may be further away from the condensation point, reducing the amount of condensation. One example of increasing the air temperature at the CAC inlet may include controlling the temperature of the intake air from the induction system. For example, an induction valve may route warmer air from underneath the hood to the induction system and through the boost chamber 44 to CAC 166. Further details on the induction system and a method for controlling the temperature of the intake air are presented at FIGS. 2-5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164. Alternatively, a two-state exhaust gas oxygen sensor may be substituted for UEGO sensor 126.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine. The electric motor may be used during purging operations, described further below, to maintain a driver torque demand.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. During the expansion stroke, the expanding gases push piston 36 back to BDC. Crankshaft 40 converts piston movement into a rotational torque of the rotary shaft. Crankshaft 40 may be used to drive alternator 168. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, an electronic storage medium for executable programs and calibration values shown as read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a pedal position sensor 134 coupled to an accelerator pedal 130 for sensing force applied by vehicle operator 132; a measurement of engine manifold absolute pressure (MAP) from pressure sensor 122 coupled to intake manifold 46; a measurement of boost pressure (Boost) from pressure sensor 123; a measurement of inducted mass air flow (MAF) from mass air flow sensor 120; a measurement of throttle position (TP) from a sensor 5; and temperature at the outlet of a charge air cooler 166 from a temperature sensor 124. Barometric pressure may also be sensed (sensor not shown) for processing by controller 12. In a preferred aspect of the present description, engine position sensor 118 produces a profile ignition pickup signal (PIP). This produces a predetermined number of equally spaced pulses every revolution of the crankshaft from which engine speed (RPM) can be determined. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. Other sensors not depicted may also be present, such as a sensor for determining the intake air velocity at the inlet of the charge air cooler, and other sensors.

Furthermore, controller 12 may communicate with various actuators, which may include engine actuators such as fuel injectors, an electronically controlled intake air throttle plate, spark plugs, camshafts, etc. Various engine actuators may be controlled to provide or maintain torque demand as specified by the vehicle operator 132. These actuators may adjust certain engine control parameters including: variable cam timing (VCT), the air-to-fuel ratio (AFR), alternator loading, spark timing, throttle position, etc. For example, when an increase in PP is indicated (e.g., during a tip-in) from pedal position sensor 134, torque demand is increased.

Figure 2:
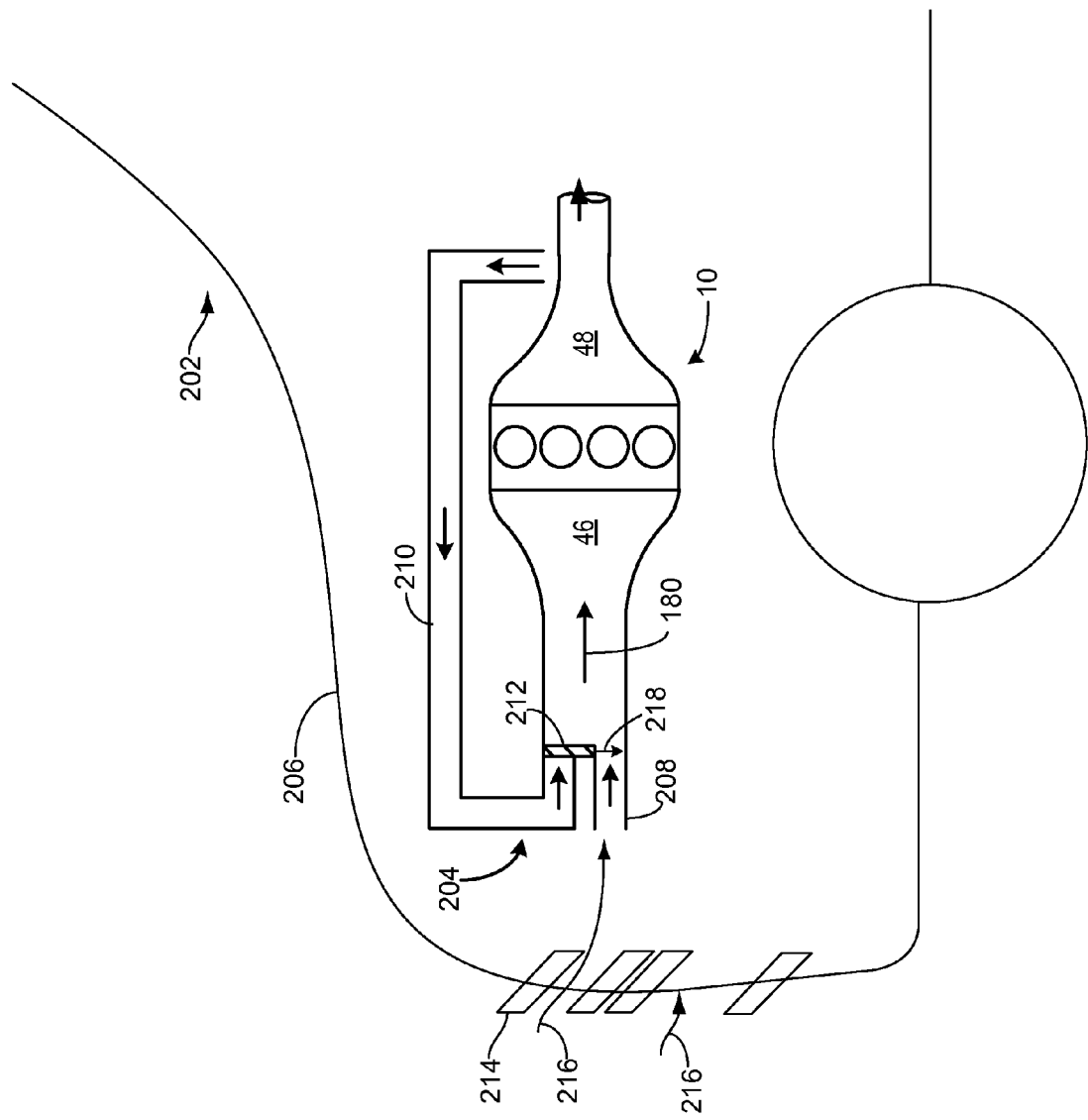
FIG. 2 is a schematic diagram of an induction system include an induction valve.

Now turning to FIG. 2, an example of an induction system 204 of an engine 10 is shown for vehicle 202. Induction system 204 may include one or more air ducts for drawing in fresh intake air. Intake air may first enter the induction system from the one or more air ducts. Thus, the air ducts may draw in intake air at the entrance of the induction system, upstream of the compressor and an air cleaner. In one embodiment, illustrated in FIG. 2, the induction system may include two air ducts. A first air duct 210 (also referred to as the warm air duct) may draw in warmed air from underneath a hood 206 of the vehicle, which may be warmed to a greater degree than air drawn in from another location, as discussed below. The inlet end of the first air duct 210 may be placed near, for example adjacent, an exhaust manifold or enclosure surrounding the exhaust manifold 48. Thus, warmer air from underneath hood 206, near exhaust manifold 48 may be drawn into the induction system through the first air duct 210. A second air duct 208 (also referred to as the cool air duct) may draw in cooler, or less warmed, air from another location further from the exhaust manifold, such as outside the vehicle. For example, vehicle 202 may include a front end with a grille. The grille may include grille shutters 214 which allow cool air 216 from outside to enter the vehicle 202. The cool air 216 may enter the engine intake through second air duct 208. In this way, cooler intake air may be drawn from an external air flow, into the second air duct 208.

An induction valve 212 may control the location from which intake air 180 is drawn into the induction system before traveling to the intake manifold 46 and entering the engine 10. For example, induction valve 212 may be a single valve, movable between a first position and a second position. Induction valve 212 may move between the first and second positions by sliding in a vertical direction, as shown by arrow 218. When the induction valve is in the first position, warmer (e.g., warmed) intake air may be drawn from under the hood by first air duct 210. When the induction valve is in the second position (as shown in FIG. 2), cooler intake air may be drawn from the cool air 216, entering from outside the vehicle, by second air duct 208. The cooler intake air may have less warming than the warmer intake air drawn in when the valve is in the first position. In some embodiments, the induction valve may be movable between a plurality of positions, allowing a mix of cooler and warmer air to enter the engine. For example, induction valve 212 may be adjusted into an intermediate position, between the first and the second position, which is partially open to the cool and warm air duct, allowing a mixture of cooler and warmer air to enter the engine. The controller 12 may have computer readable instructions for adjusting the position of the induction valve to control the temperature of the intake air passing through the CAC and into the intake manifold. As discussed further below, the controller may adjust the induction valve responsive to engine operating conditions.

The location from which intake air is drawn may be altered by adjusting the position of the induction valve. In this way, adjusting the position of the induction valve may allow for control of the intake air temperature and engine operating conditions. For example, warmer air may increase engine performance during engine startup or warm-up conditions. Specifically, warmed intake air may increase engine temperatures. By increasing the temperature of engine fluids, their viscosities may be decreased, potentially decreasing frictional losses. Pumping losses are the work the engine has to perform to induct the air through the induction system, throttle, intake manifold and intake valves. Warmer air may be less dense. Therefore, to get the desired cylinder air charge to deliver the driver demanded torque, the throttle must be opened more. Increasing the throttle opening in turn decreases the pumping work. The resulting reduction of frictional and pumping losses may increase fuel economy.

As another example, a fresh air source position of intake air may be adjusted responsive to a condition of a CAC, such as condensate formation in the CAC. As discussed above, warmed intake air may also increase the temperature of the charge air entering the CAC. As a result, the warmer air traveling through the CAC may be above the condensation point. Thus, warmer intake air may decrease the amount of condensation in the CAC. Additionally, warmer intake air may warm other engine components such as the throttle. Under some conditions, the throttle may experience throttle body icing. Thus, warmer intake air may be utilized to reduce throttle body icing. Further, warmer intake air may be used during low engine load and/or idle conditions and during times when pumping losses may be reduced.

In some examples, warmer intake air may decrease engine performance. For example, warmer air entering the intake manifold may result in having to retard spark advance to borderline knock limits. As spark approaches the borderline knock limit (e.g., retarded from MBT spark location), fuel economy may decrease, resulting in fuel economy losses. Thus, if fuel economy losses due to spark retard nearing the borderline knock limit are greater than the fuel economy benefits of warmer intake air to decrease pumping losses, the induction valve may be closed to the warmer air and opened to the cooler air. If engine knock limits are reached at any point, the induction valve may be adjusted to the second position to draw in cooler intake air. Cooler air may increase a borderline knock limit such that spark retard may be advanced more. Conversely, warmer air may decrease the borderline knock limit, limiting spark timing.

Thus, the induction valve may be controlled responsive to engine operating conditions. Engine operating conditions may include engine temperature, condensate formation in the CAC, engine load, throttle body temperatures, pumping losses, and a borderline knock limit. For example, the induction valve may be adjusted into a first position, drawing in warmed intake air from under the hood of the vehicle. Alternatively, the induction valve may be adjusted into a second position, drawing in cooler intake air with less warming than in the first position. The induction valve may be adjusted into the first position responsive to each of an amount of condensate in the CAC above a first threshold level, engine temperature below a threshold temperature, engine load below a threshold load (e.g., idle condition), and throttle body icing. Engine temperature below a threshold temperature may indicate engine warm-up periods when the engine is starting (e.g., an engine cold start condition). The induction valve may be adjusted into the second position, responsive to spark timing within a threshold of a borderline knock limit. In this example, fuel economy losses due to spark retard nearing the borderline knock limit may be greater than fuel economy benefits due to reduced pumping losses. In some embodiments, the induction valve may be moved into an intermediate position, allowing a mixture of warmer and cooler air to be drawn into the induction system. In one example, the induction valve may be adjusted into the intermediate position to reduce condensate formation while limiting fuel economy losses due to spark retard nearing borderline knock limits.

In one example, positioning of the induction valve may be done in a closed loop fashion around a desired (e.g., measured) intake air temperature. For example, the induction valve may be adjusted between the first, the second, and the intermediate position based on feedback of a measured induction (e.g., intake) air temperature. Specifically, the intake air temperature may be controlled based on the measured intake air temperature and threshold temperatures based on pumping friction and borderline spark retard from MBT spark. For example, the valve may be adjusted to increase or decrease induction air temperature, based on the measured intake air temperature in relation to threshold temperatures. In one example, a lower temperature threshold may be set based on pumping friction losses. In another example, a higher temperature threshold may be set based on fuel economy losses from spark timing approaching a borderline knock limit. For example, the controller may adjust the induction valve to draw in cooler air in response to an intake air temperature above a higher temperature threshold. This may, in turn, increase the borderline knock limit such that spark retard may be advanced more. Thus, fuel economy losses due to spark retard nearing the borderline knock limit may be reduced.

Figure 3:
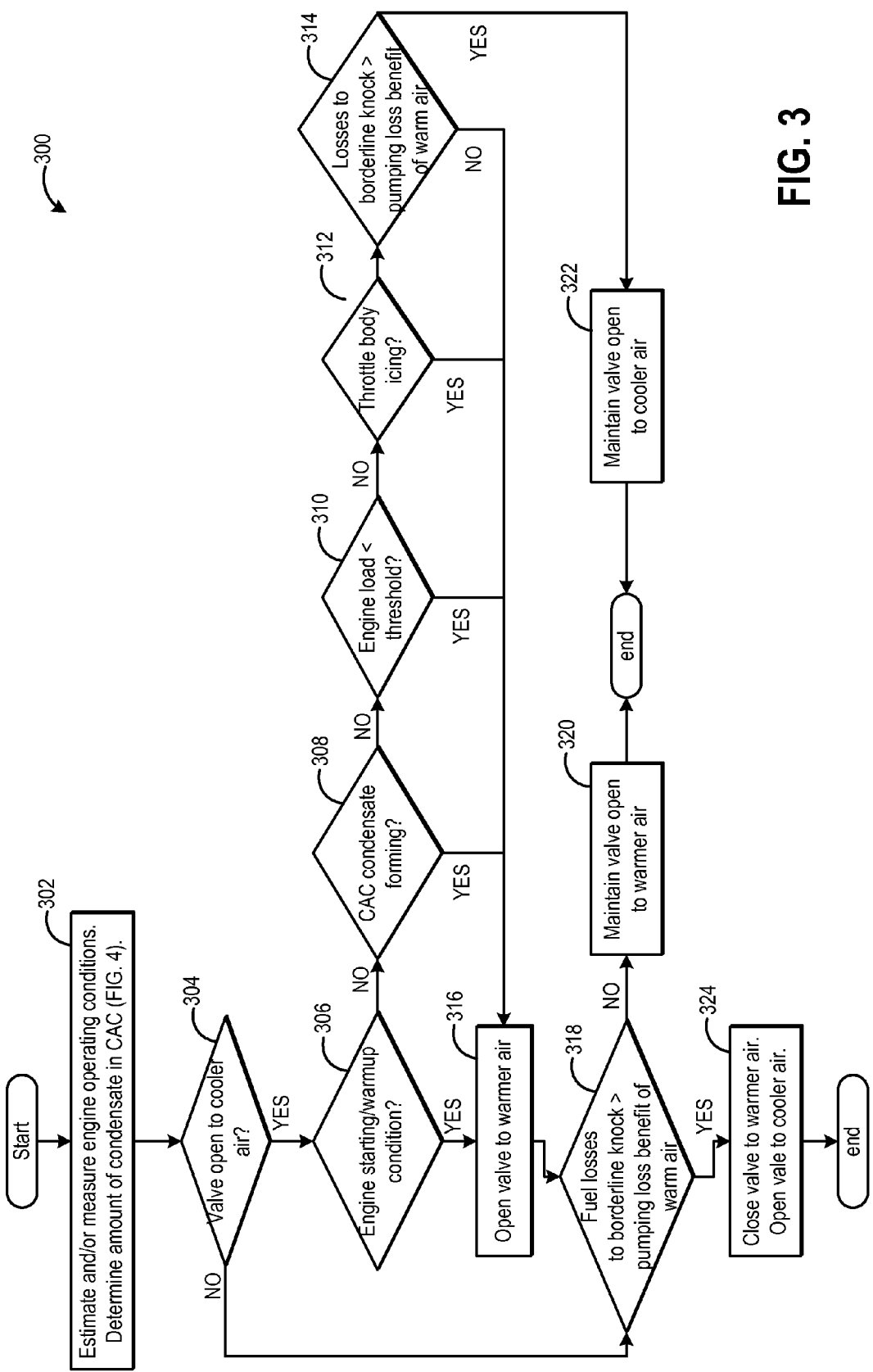
FIG. 3 shows a flow chart of a method for adjusting the location from which intake air is drawn into an induction system, responsive to engine operating conditions.

Turning now to FIG. 3, a method 300 for adjusting the location from which intake air is drawn into an induction system is presented. By adjusting the position of an induction valve, the temperature of the intake air may be changed. Specifically, the induction valve may be opened to warmer air from under the hood (first position) or opened to cooler air from an external air flow (second position). The position of the induction valve may be adjusted in response to engine operating conditions. These conditions may include engine temperature, condensate formation in the CAC, pumping losses, a borderline knock limit, and throttle body icing.

At 302, the routine begins by estimating and/or measuring engine operating conditions. Engine operating conditions may include engine speed and load, engine temperatures, throttle position, air mass flow, engine airflow rate, CAC conditions (inlet and outlet temperature, inlet and outlet pressure, etc.), ambient temperature and humidity, MAP, and boost level. Condensate formation, such as an amount or level of condensate in the CAC, may be determined based on this data at 302. In one example, and as further elaborated at the model at FIG. 4, a rate of condensate formation within the CAC may be based on ambient temperature, CAC outlet temperature, CAC outlet pressure ratio to ambient pressure, air mass flow, EGR, and humidity. This may then be used to calculate the amount or level of condensate in the CAC. In another example, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

Returning to FIG. 3, at 304 the routine determines if the induction valve is open to cooler air (e.g., in the second position, open to the cool air duct). If the induction valve is open to cooler air, the routine continues on to 306 to check if there is an engine starting or engine warm-up condition. This condition may be an engine temperature below a threshold temperature. If this condition is satisfied, the induction valve is opened to warmer air at 316 by adjusting the valve from the second to the first position. However, if the warm-up condition is not satisfied, the routine continues on to 308 to determine if condensate is forming in the CAC. Condensate formation may be based on conditions of the CAC (e.g., inlet and outlet temperature and pressure), ambient conditions (e.g., ambient temperature and humidity), rain sensors, engine speed and load, etc. In one example, condensate formation in the CAC may be confirmed if condensate formation, such as an amount or rate of condensate formation, is above a first threshold level. In one example, the first threshold level may be any amount of condensate or rate of condensate formation above zero. In another example, the first threshold level may be a value greater than zero. In yet another example, the first threshold level may be based on predicted condensate formation. For example, if rain or humidity sensors indicate high humidity, increased condensate formation may be predicted and used to indicate condensate formation in the CAC at 308. In this way, at 308, the routine may determine if conditions are present to generate condensate.

Returning to 308, if condensate is forming in the CAC (e.g., condensate is above a first threshold level), the controller may close the induction valve to cooler air and open the valve to warmer air at 316. Alternatively, if condensate is not forming in the CAC (e.g., condensate is not above the first threshold level), the routine continues on to 310 to determine if engine load is below a threshold load. Engine load may be determined at 302 and be based on air mass flow, torque, accelerator pedal position, and throttle position. For example, if the vehicle is in an idle condition, engine load may be below the threshold load. If engine load is below the threshold load at 310, the induction valve may be adjusted to the first position, opening the valve to warmer air at 316. Alternatively, if engine load is not below the threshold load, the routine may continue on to 312 to check if the throttle body is icing. Alternatively at 310, air mass flow rate may be used to determine the position of the induction valve. For example, if air mass flow rate is below a first threshold rate, the induction valve may be opened to warmer air. However, if air mass flow rate is above a second threshold rate, the induction valve may be maintained open to cooler air. The second threshold rate may be based on the air mass flow rate in which condensate is stripped from the CAC and enters the intake manifold of the engine. During this condition, condensate may not form in the CAC and cooler air may provide more stable combustion during the ingestion of condensate.

Returning to 312, throttle body icing may be determined by a temperature sensor measuring throttle body temperature. Alternatively, throttle body icing may be estimated from engine temperature. In yet another example, the throttle not moving to a desired position and intake air temp less than a threshold may indicate throttle body icing. If the controller determines that the throttle body is icing, the routine opens the induction valve to warmer air at 316. Alternatively, if the throttle body is not icing, the routine continues on to 314 to determine if losses due to spark timing approaching a borderline knock limit are greater than the pumping loss benefit of warmer air. Spark timing losses may be losses to fuel economy due to spark timing being within a threshold of a borderline knock limit from MBT spark timing. If the fuel economy losses due to spark retard nearing the borderline knock limit from MBT spark timing are less than the pumping loss benefit of warmer air, the routine opens the induction valve to warmer air at 316. As such, pumping friction losses may be reduced. However, if spark timing losses are greater than the pumping loss benefit of warm air at 314, the controller may maintain the induction valve position open to cooler air at 322.

If the induction valve is opened to warmer air (e.g., in the first position), the routine continues on to 318 to check if spark timing is within a threshold of the borderline knock limit. For example, if spark retard is within a threshold of the borderline knock limit (e.g. significantly retarded from MBT spark timing), fuel economy may be reduced. If spark timing is within the threshold of the borderline knock limit, the routine closes the induction valve to warmer air and opens the valve to cooler air at 324 (e.g., induction valve is adjusted from the first position to the second position). However, if spark is not within the threshold of the borderline knock limit, the routine may maintain the induction valve in the first position, open to warmer air, at 320.

Returning to 304, if the induction valve is not open to cooler air the valve may be open to warmer air (e.g., in the first position, open to the warm air duct). In this example, the valve is moveable between a first a second position and either open to warmer (e.g., warmed) or cooler (e.g., less warming) air, respectively. In an alternate example, the induction valve may have one or more intermediate positions that may allow a mixture of warmer and cooler air to enter the engine. In one example, as described above, the position of the induction valve may be controlled in a closed loop fashion around a desired induction inlet temperature. In this example, the routine may determine the percentage fuel economy loss from borderline spark retard (from MBT) and compare this value to the pumping work increase due to cooler air. The controller may then implement closed loop control around the induction air temperature to balance the borderline knock limit and pumping losses.

In the example presented at FIG. 3, if the induction valve is not open to cooler air, it may be open to warmer air. Thus, the routine continues on to 318 to check if spark timing is within a threshold of the borderline knock limit. The routine then continues on, as described above, to either 324 or 320.

In some embodiments, the default or standard position of the induction valve may be the first position, such that warmer intake air is drawn into the induction system. The induction valve may then be adjusted to the second position, drawing in cooler air, when the fuel economy losses to spark timing approaching a borderline knock limit are greater than the pumping loss benefits of warmer intake air. As such, the induction valve may be adjusted to draw in cooler air responsive to spark timing within a threshold of a borderline knock limit from MBT spark timing.

In this way, a fresh air source position of intake air may be adjusted by adjusting the position of an induction valve, responsive to a condition of a CAC such as condensate formation in the CAC. Condensate formation may be determined by a method for estimating the amount of condensate in the CAC, such as the method presented below at FIG. 4. The adjusting may further be responsive to one or more of an engine knock indication (e.g., whether spark timing is within a threshold of a borderline limit), a throttle body icing condition, engine temperature, and engine load.

Figure 4:
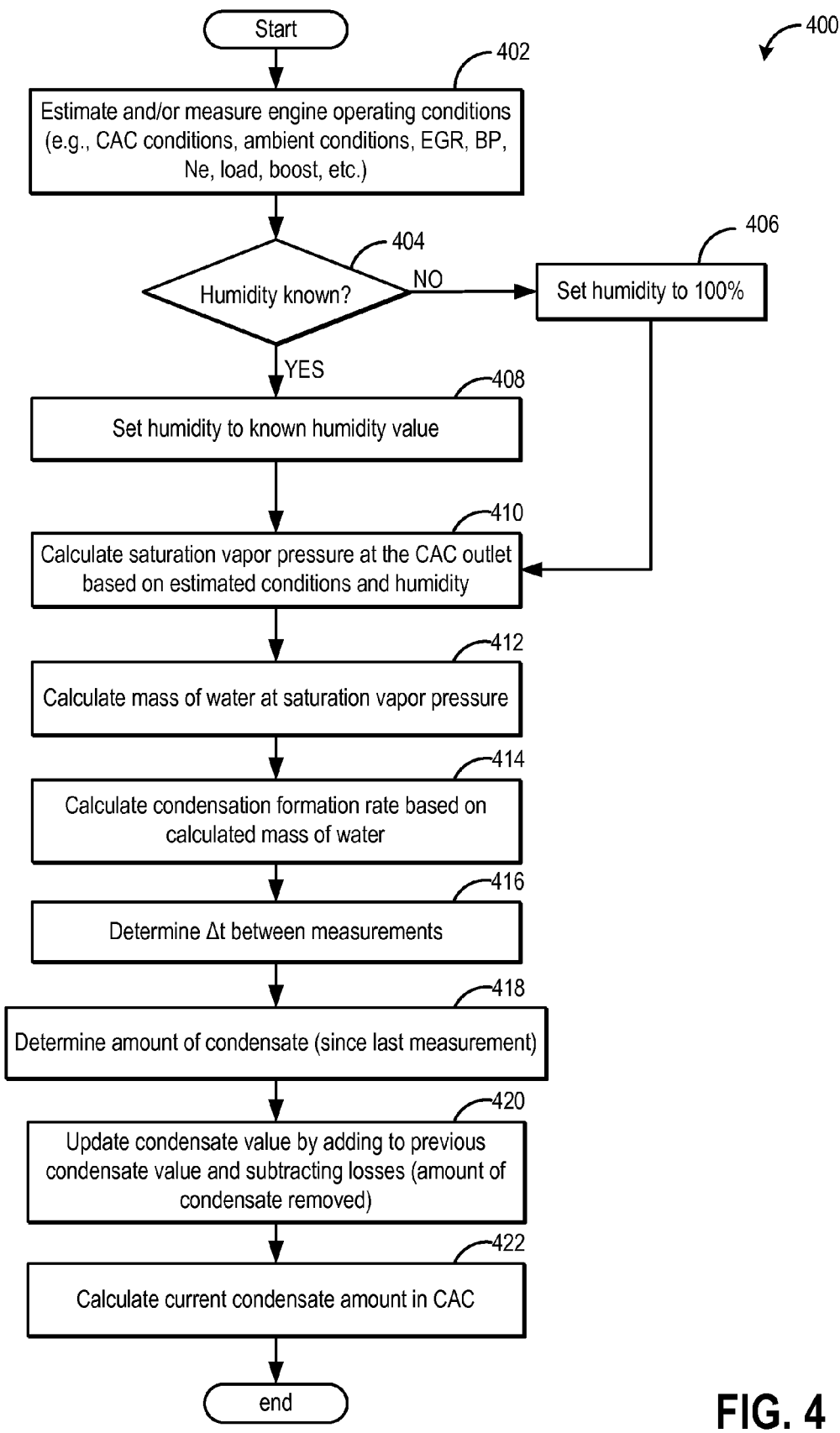
FIG. 4 shows a flow chart illustrating a method for determining the amount of condensate within a CAC according to an embodiment of the present disclosure.

FIG. 4 illustrates a method 400 for estimating the amount of condensate stored within a CAC. Based on the amount of condensate at the CAC relative to a threshold value, the position of an induction valve and the increase in engine airflow during an acceleration event may be controlled with the routines shown at FIGS. 3 and 5.

The method begins at 402 by determining the engine operating conditions. These may include, as elaborated previously at 302, ambient conditions, CAC conditions (inlet and outlet temperatures and pressures, flow rate through the CAC, etc.), mass air flow, MAP, EGR flow, engine speed and load, engine temperature, boost, etc. Next, at 404, the routine determines if the ambient humidity (humidity) is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set at 406 to 100%. In an alternate embodiment, the humidity may be estimated based on inferred conditions, such as CAC efficiency and windshield wiper speed. However, if the humidity is known, the known humidity value, as provided by the humidity sensor, may be used as the humidity setting at 408.

The ambient temperature, pressure, and humidity may be used to determine the dew point of the intake air, which may be further affected by the amount of EGR in the intake air (e.g., EGR may have a different humidity and temperature than the air from the atmosphere). The difference between the dew point, the pressure ratio of the CAC to the ambient pressure, and the CAC outlet temperature indicates whether condensation will form within the cooler, and the mass air flow may affect how much condensation actually accumulates within the cooler. At 410, an algorithm may calculate the saturation vapor pressure at the CAC outlet as a function of the CAC outlet temperature and pressure. The algorithm then calculates the mass of water at this saturation vapor pressure at 412. Finally, the condensation formation rate at the CAC outlet is determined at 414 by subtracting the mass of water at the saturation vapor pressure condition at the CAC outlet from the mass of water in the ambient air. By determining the amount of time between condensate measurements at 416, method 400 may determine the amount of condensate within the CAC since a last measurement at 418. The current condensate amount in the CAC is calculated at 422 by adding the condensate value estimated at 418 to the previous condensate value and then subtracting any condensate losses since the last routine (that is, an amount of condensate removed. for example, via purging routines) at 420. Condensate losses may be assumed to be zero if the CAC outlet temperature was above the dew point. Alternatively, condensate losses above the dew point may be tracked via evaporation. Alternatively, at 420, the amount of condensate removed may be modeled or determined empirically as a function of air mass and integrated down with each software task loop (that is, with each run of routine 400).

Now turning to FIG. 5, graph 500 shows example induction valve adjustments based on engine operating conditions. Specifically, graph 500 shows changes in induction valve position at plot 502 in response to changes in engine temperature at plot 504, changes in CAC condensate level at plot 506, changes in spark timing at plot 508 relative to a borderline knock limit 516, and changes in engine load at plot 512. Additionally, vehicle speed is shown at plot 510 and throttle position is shown at plot 514. Induction valve position may also be based on pumping losses which may increase at smaller throttle opening and cooler intake air temperatures. Spark timing may be advanced or retarded from MBT. A borderline knock limit 516 may change based on engine operating conditions, including the temperature of the intake air, as dictated by the position of the induction valve. The induction valve may be adjusted between a first position, open to warmer air (shown as 'W' at plot 502), and a second position, open to cooler air (shown as 'C' at plot 502).

Prior to time t1, the vehicle speed (plot 510) and engine load (plot 512) may be low and the throttle opening may be small (plot 514). Engine temperature may be below a threshold temperature 518, indicating the engine starting. In response to an engine warm-up condition (e.g., engine temperature below a threshold temperature), the induction valve may be adjusted to draw in warmer intake air at time t1 (plot 502). As a result, the borderline knock limit 516 may be retarded further from MBT. Vehicle speed may be increasing (plot 510), increasing engine load (plot 512), throttle opening (plot 514), and engine temperature (plot 504). Between time t1 and time t2, spark becomes more retarded from MBT. Just before time t2, fuel economy losses from spark retard may become greater than the fuel economy benefits of warmer air to pumping losses. As a result, the induction valve may be adjusted to draw in cooler intake air at time t2 (plot 502) and the borderline knock limit 516 may advance toward MBT.

The cooler intake air may cause the CAC condensate level to increase between time t2 and time t3(plot 506). At time t3, the CAC condensate level increases above a first threshold level T1. In one embodiment, the first threshold level may be relatively zero, such that any amount of condensate formation may cause the controller to adjust the induction valve to draw in warmer intake air. As such, in response to condensate formation at time t3, the controller may adjust the induction valve to draw in warmer intake air (plot 502). Condensate may decrease slowly, eventually dropping below the first threshold level T1 between time t3 and time t4. The induction valve may remain open to warmer air to reduce pumping losses. Pumping losses may be due to the partially open throttle (plot 514). At time t4, the vehicle may accelerate, shown by an increase in vehicle speed (plot 510). In response, throttle opening and engine load may increase. At this point, fuel economy losses due to spark nearing the borderline knock limit 516 may be greater than the pumping losses. Thus, at time t5, the induction valve may be switched to draw in cooler intake air. As a result, the borderline knock limit 516 advances toward MBT. Spark timing may then be further away from the borderline knock limit 516 (plot 508) after time t5. At time t6, the vehicle may begin decelerating (plot 510), reducing throttle opening and engine load. Spark timing during the deceleration between time t6 and time t7 may be close to MBT, as the engine load is lighter and the engine is not borderline limited (e.g., borderline knock limit 516 is near MBT). As the vehicle continues to decelerate, engine load may decrease below a threshold load 520 (plot 512) at time t7. In response, the induction valve closes to cooler air and opens to warmer air.

In this way, in response to increased CAC condensate formation warmer intake air may be drawn into the induction system. Increased condensate formation may include a condensate level in the CAC above a first threshold level, shown at time t3. Further, in response to engine temperature below a threshold temperature, shown at time t1, and engine load below a threshold load, shown at time t7, warmer intake air was drawn into the induction system. In response to decreased CAC condensate formation and the potential for engine knock, the controller adjusted the induction valve to draw in cooler intake air into the induction system at time t2 and time t5.

In this way, condensate formation in a CAC may be reduced by increasing the temperature of the charge air entering the CAC. By adjusting the position of an induction valve, the temperature of intake air entering the CAC and the engine may be controlled responsive to engine operating conditions. The induction valve may be movable between two or more positions, changing the location from which intake air is drawn. The induction valve may be opened to warmer air when the condensate level in the CAC is greater than a threshold level, engine temperature is below a threshold temperature, engine load is below a threshold load, or the throttle body is icing. Alternatively, the induction valve may be opened to cooler air when spark timing is within a threshold of a borderline knock limit. As such, fuel economy losses and condensate formation may be reduced.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
adjusting a fresh air source position of intake air drawn into an induction system of an engine upstream of a compressor responsive to a determined amount of condensate in of a charge air cooler.

2. The method of claim 1, wherein the determined amount of condensate in the charge air cooler is greater than zero and wherein the adjusting is further responsive to one or more of an engine knock indication, a throttle body icing condition, engine temperature, and engine load, where the engine knock indication includes whether spark timing is within a threshold of a borderline limit or an amount of retard from MBT timing, and wherein the fresh air source position of intake air drawn into the induction system is further positioned upstream of an air cleaner.

3. The method of claim 2, wherein the adjusting includes adjusting a position of an induction valve, the induction valve positioned at an entrance to the induction system, upstream of the compressor.

4. The method of claim 3, wherein when the induction valve is in a first position, warmed intake air is drawn from under a hood of a vehicle to the entrance of the induction system.

5. The method of claim 3, wherein when the induction valve is in a second position, intake air is drawn with less warming than in the first position from air entering from outside a vehicle in which the engine is installed to the entrance of the induction system.

6. The method of claim 4, wherein the induction valve is adjusted into the first position, responsive to each of the amount of condensate in the charge air cooler above a first threshold level and engine temperature below a threshold temperature, where the first threshold level is greater than zero.

7. The method of claim 6, wherein engine temperature below the threshold temperature includes an engine warm-up period from an engine cold start condition.

8. The method of claim 6, wherein the induction valve is adjusted into the first position further responsive to an idle condition.

9. The method of claim 6, further comprising adjusting the induction valve into the first position responsive to fuel economy losses due to spark retard nearing the borderline knock limit from MBT spark timing being less than a pumping loss benefit of warmer air.

10. The method of claim 5, wherein the induction valve is adjusted into the second position, responsive to spark timing with the threshold of the borderline knock limit from MBT spark timing.

11. The method of claim 3, wherein the induction valve is a single valve, movable between a first and a second position.

12. The method of claim 11, wherein the induction valve is movable into an intermediate position, between the first and the second position.

13. The method of claim 12, wherein when the induction valve is in the intermediate position, a mixture of warmer and cooler air is drawn into the induction system.

14. The method of claim 12, further comprising adjusting the induction valve between the first, the second, and the intermediate position based on feedback of a measured induction air temperature.

15. The method of claim 14, wherein the adjusting the induction valve based on measured induction air temperature further includes determining threshold temperatures based on pumping friction and borderline spark retard from MBT spark.

16. An engine method, comprising:
responsive to an increase in a determined amount of condensate in a charge air cooler over a non-zero threshold level, drawing warmed intake air into an induction system upstream from a compressor;
responsive to one or more of a decrease in the amount of condensate in the charge air cooler below the non-zero threshold level, and potential for engine knock, drawing less warmed intake air, relative to the warmed intake air, into the induction system upstream from the compressor.

17. The method of claim 16, further comprising, responsive to engine temperature below a threshold temperature, drawing warmed intake air into the induction system upstream from the compressor.

18. The method of claim 16, wherein the warmed intake air is drawn from underneath a vehicle hood, adjacent to an exhaust manifold.

19. The method of claim 16, wherein the less warmed intake air is drawn from an external air flow from outside a vehicle, the external air flow including ambient air, and where the external air flow from outside the vehicle is further away from an exhaust manifold than from where the warmed intake air is drawn.

20. An engine system of a vehicle, comprising:
an engine including an intake manifold and an exhaust manifold;
a turbocharger including a compressor;
an induction system, the induction system including a first air duct for drawing warmed air from underneath a hood, adjacent the exhaust manifold, into an entrance of the induction system positioned upstream of the compressor, a second air duct for drawing cooler air from another location further from the exhaust manifold into the entrance of the induction system, and an induction valve positioned at the entrance of the induction system upstream of the compressor for adjusting a location from which intake air is drawn into the entrance of the induction system;
a charge air cooler downstream of the induction valve;
an intake throttle downstream of the charge air cooler and upstream of the intake manifold; and
a controller with computer readable instructions for adjusting a position of the induction valve to control a temperature of the intake air passing through the charge air cooler and into the intake manifold responsive to engine temperature, a determined amount of condensate in the charge air cooler, engine load, throttle body icing, pumping losses, and a borderline knock limit, where the determined amount of condensate is an amount greater than zero.

\* \* \* \* \*